(12) United States Patent
Books et al.

(10) Patent No.: US 10,124,792 B2
(45) Date of Patent: Nov. 13, 2018

(54) HYBRID VEHICLE WITH LOW POWER BATTERY

(71) Applicant: Cummins Inc., Columbus, IN (US)

(72) Inventors: Martin T. Books, Columbus, IN (US); Mahesh Madurai Kumar, Columbus, IN (US)

(73) Assignee: Cummins Inc., Columbus, IN (US)

( * ) Notice: Subject to any disclaimer, the term of this patent is extended or adjusted under 35 U.S.C. 154(b) by 93 days.

(21) Appl. No.: 15/421,530

(22) Filed: Feb. 1, 2017

(65) Prior Publication Data

US 2017/0232954 A1 Aug. 17, 2017

Related U.S. Application Data

(60) Provisional application No. 62/294,560, filed on Feb. 12, 2016.

(51) Int. Cl.
*B60W 20/14* (2016.01)
*B60W 20/12* (2016.01)
(Continued)

(52) U.S. Cl.
CPC .............. *B60W 20/14* (2016.01); *B60L 1/00* (2013.01); *B60L 11/14* (2013.01); *B60L 11/1814* (2013.01); *B60L 11/1861* (2013.01); *B60L 11/1868* (2013.01); *B60W 10/06* (2013.01); *B60W 10/08* (2013.01); *B60W 10/18* (2013.01); *B60W 20/12* (2016.01); *B60W 20/40* (2013.01); *B60W 30/18127* (2013.01); *B60W 40/076* (2013.01); *H01M 10/46* (2013.01); *H01M 10/48* (2013.01); *H02J 7/007* (2013.01); *H02P 27/06* (2013.01);

*B60L 2210/40* (2013.01); *B60L 2240/642* (2013.01); *B60W 2510/244* (2013.01); *B60W 2550/142* (2013.01);
(Continued)

(58) Field of Classification Search
CPC ...... B60W 20/14; B60W 20/12; B60W 10/06; B60W 10/08; B60W 10/18; B60W 20/40; B60W 30/18127; B60L 1/00; B60L 1/14
See application file for complete search history.

(56) References Cited

U.S. PATENT DOCUMENTS

| | | | |
|---|---|---|---|
| 5,291,960 A | 3/1994 | Brandenburg et al. | |
| 7,267,090 B2 * | 9/2007 | Tamai | B60L 11/1868 123/179.3 |
| 7,689,341 B2 * | 3/2010 | Miller | B60K 6/12 701/70 |
| 8,307,930 B2 | 11/2012 | Sailor et al. | |

(Continued)

*Primary Examiner* — Yazan A Soofi
(74) *Attorney, Agent, or Firm* — Taft Stettinius & Hollister LLP

(57) ABSTRACT

Systems, methods and apparatus for controlling operation a hybrid powertrain are disclosed that use low power storage and motor/generator components in line haul operations. In one embodiment, a line haul drive cycle includes a low power motor/generator executing a power assistance operation of the hybrid powertrain powered by electricity from a low power storage responsive to a monitoring by a line haul controller of ascensions of the hybrid vehicle at or near a constant speed over an uneven terrain. The line haul drive cycle further includes the low power motor/generator executing a regenerative braking operation of the hybrid powertrain supplying captured electric energy to the low power storage responsive to a monitoring by the line haul controller of descensions of the hybrid vehicle at or near the constant speed over the uneven terrain.

20 Claims, 2 Drawing Sheets

(51) Int. Cl.

| | |
|---|---|
| *B60W 10/06* | (2006.01) |
| *B60W 10/08* | (2006.01) |
| *B60W 10/18* | (2012.01) |
| *B60W 20/40* | (2016.01) |
| *B60W 40/076* | (2012.01) |
| *B60W 30/18* | (2012.01) |
| *B60L 1/00* | (2006.01) |
| *B60L 1/14* | (2006.01) |
| *B60L 11/18* | (2006.01) |
| *H02P 27/06* | (2006.01) |
| *H02J 7/00* | (2006.01) |
| *H01M 10/46* | (2006.01) |
| *H01M 10/48* | (2006.01) |
| *B60L 11/14* | (2006.01) |

(52) U.S. Cl.
CPC . *B60W 2710/086* (2013.01); *B60W 2710/248* (2013.01); *H01M 2220/20* (2013.01); *Y10S 903/93* (2013.01)

(56) References Cited

U.S. PATENT DOCUMENTS

| | | | |
|---|---|---|---|
| 9,840,161 B2 * | 12/2017 | Chikkannanavar | ......................... B60L 11/1861 |
| 2010/0117594 A1 * | 5/2010 | Bissontz | ................. B60K 6/48 320/104 |
| 2011/0011659 A1 * | 1/2011 | Sailor | ..................... B60K 1/04 180/65.245 |
| 2015/0367747 A1 * | 12/2015 | Decker | ............... B60L 11/1862 320/136 |

* cited by examiner

HYBRID VEHICLE WITH LOW POWER BATTERY

CROSS REFERENCE

The present application claims priority to and the benefit of U.S. Application No. 62/294,560, filed Feb. 12, 2016 the disclosure of which is hereby incorporated by reference.

BACKGROUND

The present disclosure relates generally to hybrid vehicles, and more particularly to hybrid vehicle apparatuses, systems and methods utilizing low power batteries that heretofore have been considered unacceptable for hybrid vehicle applications. As a purely theoretical matter, batteries having a wide range of power characteristics could be proposed for use in a hybrid vehicle system. In practice, however, fuel economy benefits sufficient to justify adoption of hybrid vehicles are realized only with batteries of sufficient power as indicated by the battery's C-Rate. In practice, hybrid vehicles have required batteries with a C-rate greater than 1-C, typically between 1-C and 6-C, in order to realize fuel economy benefits that justify their adoption. There remains a significant need for the unique apparatuses, methods and systems disclosed herein

DISCLOSURE

For the purposes of clearly, concisely and exactly describing exemplary embodiments of the disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

SUMMARY

Unique hybrid vehicle systems including low-power batteries and apparatuses, methods and systems of operating the same are disclosed. In one embodiment, a line haul drive cycle includes a low power motor/generator executing an acceleration of the hybrid powertrain powered by electricity from a low power storage responsive to a monitoring by a line haul controller of ascensions of the hybrid vehicle at or near a constant speed over an uneven terrain. The line haul drive cycle further includes the low power motor/generator executing a regenerative braking of the hybrid powertrain supplying captured electric energy to the low power storage responsive to a monitoring by the line haul controller of descensions of the hybrid vehicle at or near the constant speed over the uneven terrain.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

Figure 1:
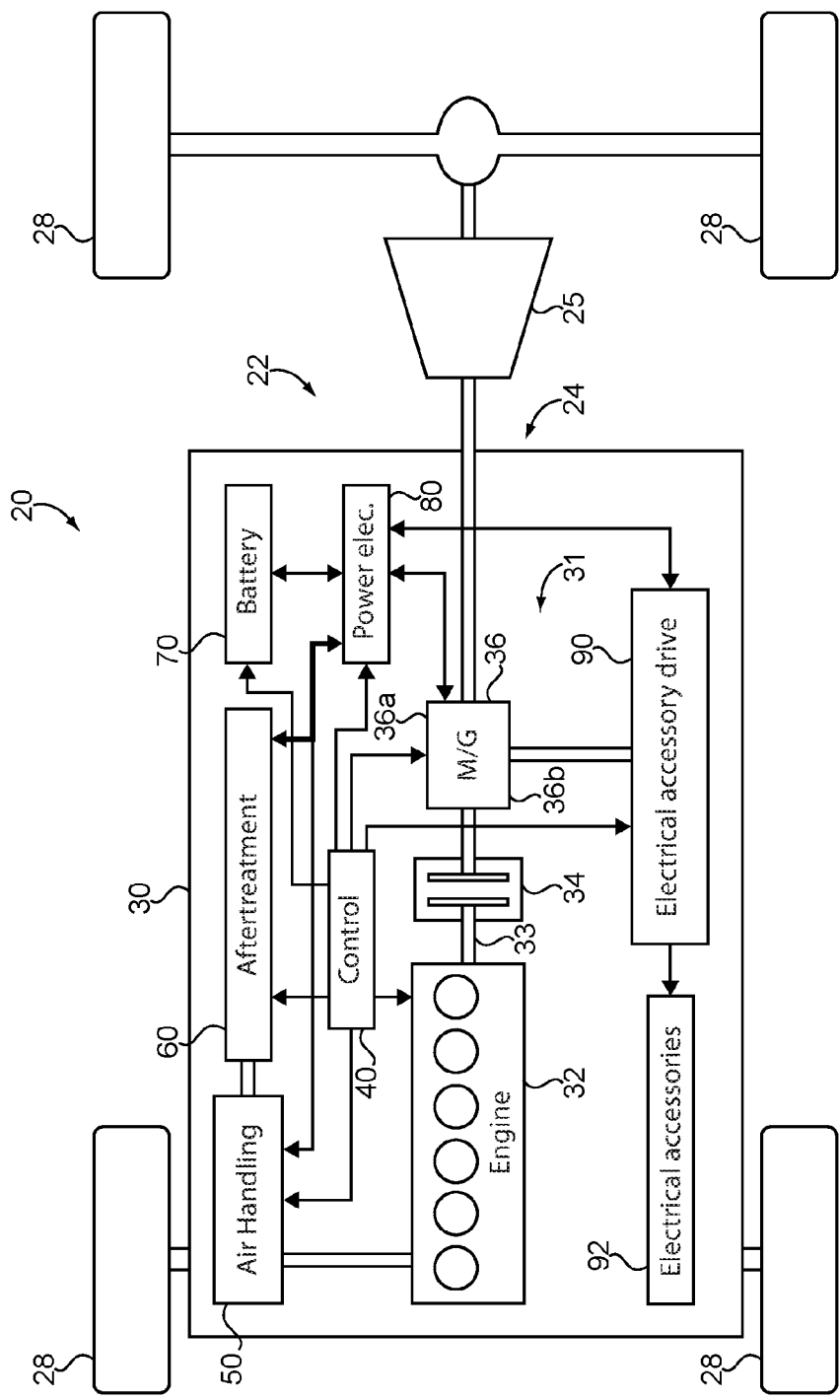
FIG. 1 is a partially diagrammatic illustration of a vehicle including an exemplary vehicle system including a hybrid powertrain.

With reference to FIG. 1, there is illustrated a partially diagrammatic view of a vehicle 20 including an example hybrid powertrain 22. Hybrid powertrain 22 includes a hybrid pretransmission hybrid system 24, a transmission 26, and ground engaging wheels 28. Depicted hybrid powertrain 22 systems is a series-parallel hybrid (selectable with clutch 34), although the system may be, without limitation, a parallel configuration, a series configuration, and/or a series-parallel hybrid system. It shall be appreciated that the configuration and components of vehicle 20 and of hybrid powertrain 22 are but one example, and that this disclosure contemplates that a variety of different hybrid vehicles and hybrid powertrain configurations and components may be utilized.

It should be appreciated that in this embodiment, the propulsion of vehicle 20 is provided by the rear wheels 28; however in other applications front wheel drive and four/all wheel drive approaches are contemplated. In one form vehicle 20 is an on-road bus, delivery truck, service truck or the like; however in other forms vehicle 20 may be of a different type, including other types of on-road or off-road vehicles. Pretransmission hybrid system 24 includes hybrid power system 30. System 30 includes internal combustion engine 32, clutch 34, motor/generator 36, controller 40 which is one example of an electronic control system and is preferably structured as one or more microprocessor-based or microcontroller-based electronic control units (ECU) sometimes referred to as electronic control modules (ECM), air handling subsystem 50, aftertreatment equipment 60, low power battery 70, power electronics 80, and electrical accessory drive subsystem 90.

Power electronics 80 may be configured to provide a bi-directional AC-DC converter which is operable in a first mode to convert AC power received from motor/generator 36 to DC power and provide the converted DC power to a DC bus and from there to charge low power batter 70, and operable as second mode to convert DC power provided by low power battery to the DC bus to AC power and provide the converted AC power to drive motor/generator 36. It shall be further appreciated that power electronics 80 may be also be configured to power additional electrical loads concurrent with the first mode and the second mode of operation such as electrical accessories 92 via electrical accessory drive 90, aftertreatment equipment 60 and air handling subsystem 50.

Low power battery 70 has power characteristics heretofore considered unsuitable for hybrid vehicle applications, particularly for heavy-duty vehicles, i.e., Department of Transportation (DOT) Class 7 vehicles which have a Gross Vehicle Weight Rating (GVWR) of 26,000-33,000 pounds and DOT class 8 vehicles which have a GVWR greater than 33,000 pounds. As used herein a low power battery refers battery power characteristics which can be quantified by a battery's C-Rate which is the maximum rate at which a battery can be charged or discharged relative to its maximum capacity. C-Rate can be defined as ratio of maximum electrical charging/discharging current to battery capacity. C-Rate can be technically expressed in units of Amperes per Ampere-Hour (Amps/Amps*Hr) which equates to inverse hours (1/Hr). For convenience C-Rate may be stated as a dimensionless value without reference to units or with the suffix "-C". By way of example, a battery rating of 1-C indicates that the charge/discharge current will charge/discharge the entire battery in 1 hour. For a battery with a capacity of 100 Amp-hrs, this equates to a maximum charge or discharge current of 100 Amps. A 4-C battery with a capacity of 100 Amp-hrs would have a maximum charge/discharge current of 400 Amps and could be fully charged/discharged in 15 minutes.

It shall be appreciated that at constant voltage or near constant voltages (i.e., those including voltage fluctuations typical to hybrid vehicle systems, for example, certain embodiments may have a steady state fluctuation from nominal of +/−5-10% and during charging or discharging my experience fluctuation from steady state of an additional +/−5-10%), C-Rate corresponds to battery power. In particular, since Amperes which appear in the numerator of the C-Rate ratio are proportional to power at a given voltage, C-Rate is therefore directly proportional to maximum battery power at a given operating point. For purposes of the present disclosure, a low power battery is preferably a battery with a C-rate less than 0.9-C, more preferably 0.5-C or less, and most-preferably 0.2-C or less. Exemplary low power battery chemistries include Nickel Manganese Cobalt with carbon cathodes (NMC-Carbon). It shall also be appreciated that a low power battery may also be a high energy battery, i.e., a battery hay have the low power C-rate characteristics disclosed herein and a high energy storage capacity. It shall be further appreciated that power electronics 80 and motor/generator 36 are sized and configured to function with low power battery and may therefore themselves be considered to be low power. As used herein, a high energy battery refers to a battery with an energy storage capacity of greater than 6 kWh, preferably greater than 12 kWh and most preferably greater than 30 kWh.

In the illustrated embodiment, system 30 is in the form of a parallel hybrid traction power source 31 such that engine 32 and/or motor/generator 36 can provide torque for power train 22 depending on whether clutch 34 is engaged or not and which of engine 32 and motor/generator 36 are operated to provide traction power. It should be appreciated that motor/generator 36 can operate as a motor 36a powered by electricity from low power battery 70, or as an electric power generator 36b that captures electric energy. In some operating conditions, the motor/generator may be passive such that it is not operating at all. In the depicted form, motor/generator 36 has a common rotor and a common stator, and is provided as an integrated unit; however in other embodiments a completely or partially separate motor, generator, rotor, stator or the like may be employed. The designated motor/generator 36 is intended to encompass such variations. It shall be appreciated that in other embodiments motor/generator 36 may be operated exclusively as a generator to capture electric energy which may be stored in low power battery 70 and consumed only by electrical loads coupled therewith.

A plurality of low power electrical loads may be operatively coupled with low power battery 70 including, for example, loads provided in or associated with air handling subsystem 50, aftertreatment equipment 60, and/or electrical accessory drive 90 which is structured to drive one or more electrical accessories 92 using power from low power battery 70. Electrical accessories 92 and other electrical loads operatively coupled with low power battery 70 via a DC bus are preferably selected and/or operated such that their nominal or rated operation is within or compatible with the C-rate of low power battery 70. Examples of such electrical accessories 92 and other electrical loads include electrified power steering pumps, electrified radiator cooling fans and electrified coolant pumps. Further examples include electrical components and systems powered by low-voltage vehicle electrical systems such as windshield wipers, headlights, interior lights, radio and other low-voltage loads (e.g., 12V loads or 24V loads). In some embodiments a DC/DC converter may be provided to convert voltage from the operating voltage of the DC bus to the operating voltage of the low-voltage system. It is further contemplated that an engine driven alternator, which has traditionally been used to power low-voltage vehicle electrical systems and loads, may be eliminated from the vehicle system, or may be configured to be selectably disengaged to mitigate parasitic loss on the engine when the low-voltage vehicle electrical system can be powered via low power batter 70.

In the illustrated embodiment, engine 32 is of a four-stroke, diesel-fueled, Compression Ignition (CI) type with multiple cylinders and corresponding reciprocating pistons coupled to crankshaft 33, which typically would be coupled to a flywheel. Crankshaft 33 is mechanically coupled to controllable clutch 34. Engine 32 may be of a conventional type with operation modifications to complement operation in system 30. In other embodiments, engine 32 may be of a different type, including different fueling, different operating cycle(s), different ignition, or the like.

Vehicle 20 further includes a controller 40 which may be configured to control various operational aspects of vehicle 20 and hybrid powertrain 22 as described in further detail herein. Controller 40 may be implemented in any of a number of ways. Controller 40 executes operating logic that defines various control, management, and/or regulation functions. This operating logic may be in the form of one or more microcontroller or microprocessor routines stored in a non-transitory memory, dedicated hardware, such as a hardwired state machine, analog calculating machine, various types of programming instructions, and/or a different form as would occur to those skilled in the art.

Controller 40 may be provided as a single component, or a collection of operatively coupled components; and may comprise digital circuitry, analog circuitry, or a hybrid combination of both of these types. When of a multi-component form, controller 40 may have one or more components remotely located relative to the others in a distributed arrangement. Controller 40 can include multiple processing units arranged to operate independently, in a pipeline processing arrangement, in a parallel processing arrangement, or the like. In one embodiment, controller 40 includes several programmable microprocessing units of a solid-state, integrated circuit type that are disturbed throughout system 30 that each include one or more processing units and non-transitory memory. For the depicted embodiment, controller 40 includes a computer network interface to facilitate communications using standard Controller Area Network (CAN) communications or the like among various system control units. It should be appreciated that the depicted modules or other organizational units of controller 40 refer to certain operating logic performing indicated operations that may each be implemented in a physically separate controller of controller 40 and/or may be virtually implemented in the same controller.

The description herein including modules and/or organizational units emphasizes the structural independence of the aspects of the controller, and illustrates one grouping of operations and responsibilities of the controller. Other groupings that execute similar overall operations are understood within the scope of the present application. Modules and/or organizational units may be implemented in hardware and/or as computer instructions on a non-transient computer readable storage medium, and may be distributed across various hardware or computer based components.

Exemplary and non-limiting implementation elements of modules and/or organizational units of the controller 40 include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

Controller 40 and/or any of its constituent processors/controllers may include one or more signal conditioners, modulators, demodulators, Arithmetic Logic Units (ALUs), Central Processing Units (CPUs), limiters, oscillators, control clocks, amplifiers, signal conditioners, filters, format converters, communication ports, clamps, delay devices, memory devices, Analog to Digital (A/D) converters, Digital to Analog (D/A) converters, and/or different circuitry or functional components as would occur to those skilled in the art to perform the desired communications.

Figure 2:
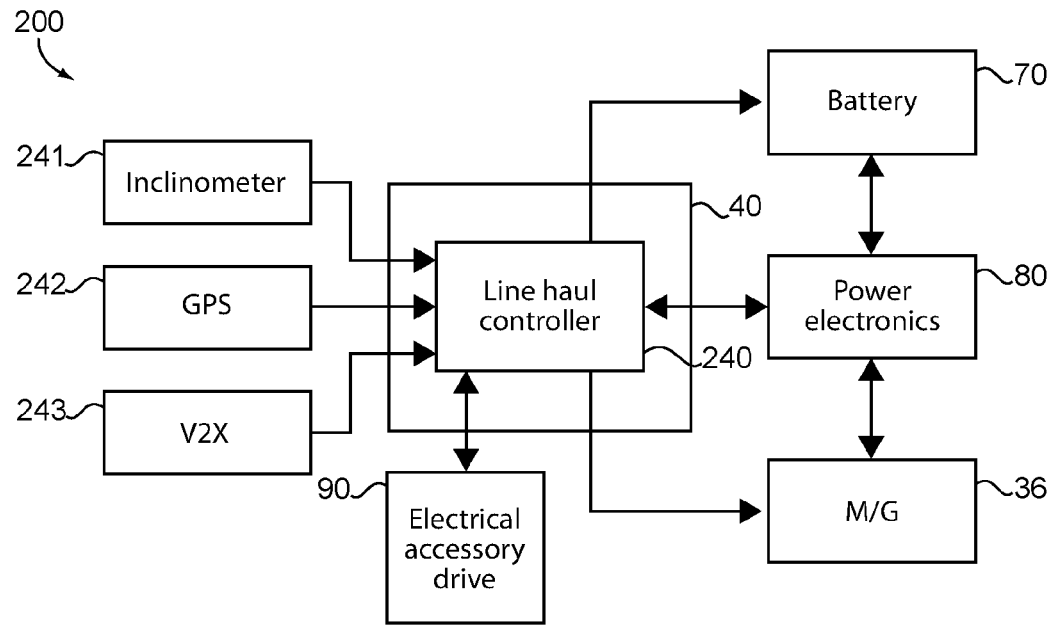
FIG. 2 is a block diagram illustrating an exemplary line haul controller which may be implemented in the system of FIG. 1.

With additional reference to FIG. 2, there is illustrated a block diagram of exemplary controls 200 which may be implemented in connection with controller 40. In the illustrated embodiment controls 200 include a line haul controller 240 embodied within the circuit of controller 40 and in operative communication with, low power battery 70, power electronics 80, motor/generator 36 and electrical accessory drive 90. Line haul controller 240 is further structured to receive inputs from inclinometer 241, global positioning system (GPS) 242, and vehicle-to-x (V2X) communication system which can be configured to provide communication with systems external to the vehicle such as vehicle to ground communication and vehicle to vehicle communication. It shall be appreciated that line haul controller 240 may be provided or may access additional inputs provided or available to controller 40 including, inputs indicating the operational state of any of the components illustrated in FIG. 1, climate control settings, operator driving inputs such as accelerator, braking and cruise control settings and inputs indicating ambient conditions such as temperature, humidity and precipitation to name a several examples.

In different embodiments, the voltage of the low power/high energy battery(ies) may be different. For example, in one embodiment, the voltage of the low power/high energy battery(ies) can be or about forty-eight (48) volts. In another example embodiment, the voltage of the low power/high energy battery(ies) can be or about three hundred and fifty (350) volts. In still another example embodiment, the voltage of the low power/high energy battery can be or about seven hundred (700) volts.

Line haul controller 240 is structured for controlling line haul drive cycles of hybrid powertrain 22 generally involving repeated ascensions and descensions of vehicle 20 at or near a constant speed over an uneven terrain. Line haul drive cycles may utilize power assistance operation of hybrid powertrain 22 to provide above average power to maintain constant speed as vehicle 20 is ascending the terrain and may utilize regenerative braking operation of hybrid powertrain 22 to maintain constant speed as vehicle 20 is descending the terrain, particularly as commanded by a cruise control governor. Line haul driving of vehicle 20 may also utilize power assistance operation of hybrid powertrain 22 to provide above average power to maintain commanded though not necessarily constant speed as vehicle 20 is ascending the terrain and may utilize regenerative braking operation of hybrid powertrain 22 to maintain commanded though not necessarily constant speed as vehicle 20 is descending the terrain, particularly as commanded by operator inputs.

Figure 3:
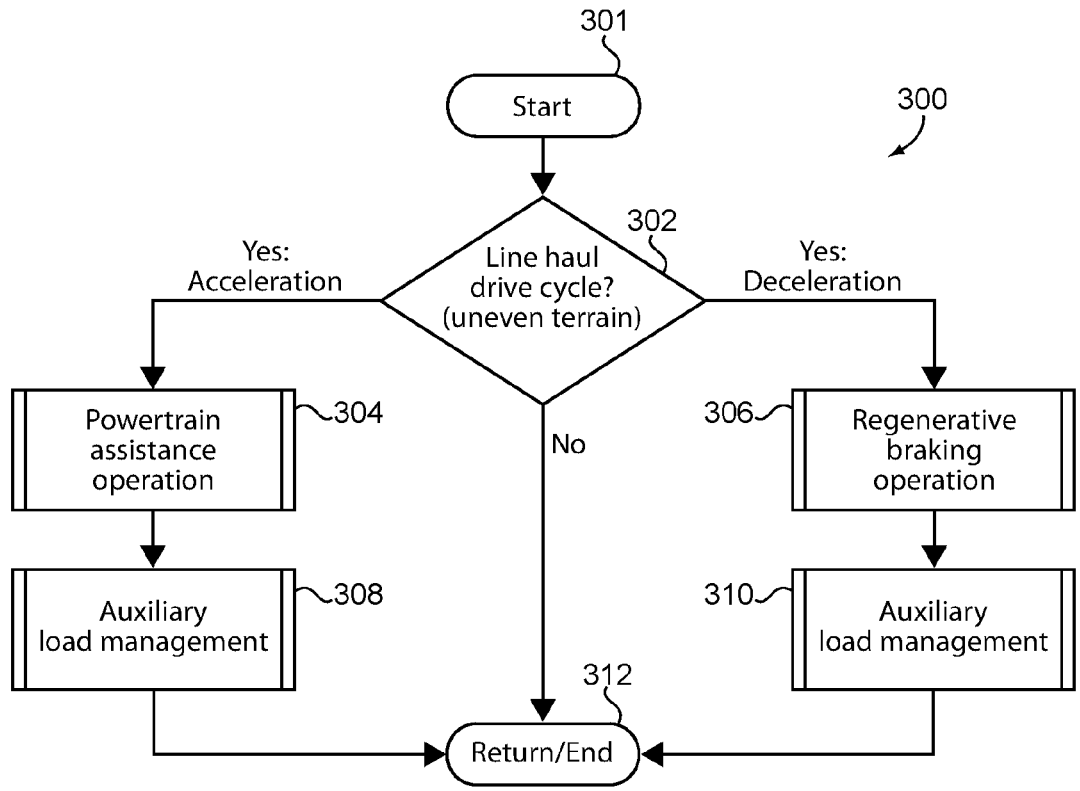
FIG. 3 a flow chart illustrating an exemplary control process which may be performed by the line haul controller of FIG. 2.

With additional reference to FIG. 3, in one embodiment, line haul controller 240 is configured to execute instructions stored in a non-transitory memory to perform operations in accordance with process 300. Process 300 begins at start operation 301 and proceeds to conditional 302. Conditional 302 is structured to perform one or more evaluations or determinations pertaining to the operation of line haul controller 240 and vehicle 20. Conditional 302 may be configured to first perform an evaluation or make a determination that vehicle 20 is in or will be entering into operating and environmental conditions compatible with line haul hybrid operation. Such a determination may be made based upon inputs received from inclinometer 241, for example, where line haul controller 240 observes variation consistent with hilly terrain, inputs received from GPS 242 or V2X communication system which indicate hilly terrain conditions, or from the operating conditions of vehicle 20 including engine load conditions or output conditions and operator drive command inputs from which line haul controller 300 may make a determination as to conditions compatible with line haul hybrid operation.

If conditional 302 indicates the presence of operating and environmental conditions compatible with line haul hybrid operation, it may then enter an active state and operate to perform an evaluation or make a determination as to how to operate line haul controller 240. In response to an evaluation or determination by conditional 302 of ascensions of vehicle 20, such as ascension at or near a constant speed or commanded speed over an uneven terrain, line haul controller 240 may controls an execution of a power assistance operation 304 of hybrid powertrain 22 by operating motor/generator 36 as a motor powered by electricity from low power battery 70. Such power assistance operation may account for and may be optimized to provide output power consistent with the C-Rate of low power battery 70, e.g., constrained at least in part by the C-Rate of low power battery 70 and/or optimized for the C-Rate of low power battery 70 or combinations thereof. Some embodiments may reduce power assistance operation or eliminate it entirely to ensure that electrical power is provided to prioritized electrical accessories such as electrified power steering pumps, electrified radiator cooling fans, electrified coolant pumps, air handling systems, aftertreatment systems and other on-engine electrified accessories which are prioritized over power assistance operation In response to an evaluation or determination by conditional 302 of descensions of vehicle 20, such as descensions at or near a constant speed or commanded speed over an uneven terrain, line haul controller 240 controls an execution of a regenerative braking operation 306 of hybrid powertrain 22 by operating motor/generator 36 as an electric power generator that captures electric energy. Such regenerative breaking operation may account for and may be optimized to provide regenerative breaking power consistent with the C-Rate of low power battery 70. Some embodiments may set limits on the power that can be generated by regenerative breaking optimized such that the low power battery 70, DC bus and/or other systems connected thereto are not overloaded. Where such limits are imposed vehicle system operation may be modified to increased reliance on friction braking. Such limits may also be dynamic, for example, both changes in the demand of the low power battery 70 and electrical accessory loads may be monitored and the limit may be dynamically raised (e.g., when electrical accessory load demand increases, charging demand of low power battery 70 increases or both conditions occur) or dynamically lowered (e.g., when electrical accessory load demand decreases, charging demand of low power battery 70 decreases or both conditions occur).

The energy reclaimed and stored through regenerative braking operation 306 could be used for a number of purposes that would offset energy normally generated by burning fuel. As described above, one example of usage would be to consume the reclaimed energy in the form of electrical powertrain assistance during hybrid-compatible line haul driving operation. Another example would be to continually collect and store energy over a long drive cycle (e.g. 11 hours of driving as may be permitted under US Federal Motor Carrier Safety Administration rules regarding Hours of Service), and then use the stored energy to power vehicle electric hotel loads during vehicle down time while the driver sleeps.

Operation 308 may be utilized in connection with operation 304 to account for auxiliary electrical loads during powertrain assistance operation. In one aspect, operation 308 may evaluate or determine the presence and additional demand or load imposed by auxiliary systems, such as electrical accessories 92 via electrical accessory drive 90, aftertreatment equipment 60 and air handling subsystem 50 during powertrain assistance operation. Operation 308 may then adjust the power output optimized for the C-Rate of low power battery 70 by decreasing the power assistance output power allocation to serve the additional demands imposed by loads operatively coupled with the DC bus of power electronics 80, or my suspending or decrease the demand or load imposed by auxiliary systems.

Operation 310 may be utilized in connection with operation 304 to account for auxiliary electrical loads during regenerative breaking operation. In one aspect, operation 310 may evaluate or determine the presence and additional demand or load imposed by auxiliary systems, such as electrical accessories 92 via electrical accessory drive 90, aftertreatment equipment 60 and air handling subsystem 50 during regenerative braking operation. Operation 310 may then adjust the power output optimized for the C-Rate of low power battery 70 by increasing the power output to serve the additional demands imposed by loads operatively coupled with the DC bus of power electronics 80.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A hybrid powertrain system for a vehicle, the system comprising:
   an internal combustion engine structured to output power to propel the vehicle;
   a motor/generator structured selectably operate as a generator to receive mechanical power from the powertrain and output AC electrical power and to selectably operate as a motor to output mechanical power to the powertrain;
   power electronics structured to selectably convert the AC electrical power received from the motor/generator to DC power provided to a DC bus and to selectably convert DC power from the DC bus to AC power to drive the motor/generator;
   a low power battery operatively coupled with the DC bus of the power electronics, the low power battery having a C-Rate less than 0.9-C; and
   a controller operatively coupled with the motor/generator and the power electronics, the controller being configured to
   identify a hybrid-compatible line haul operating state of vehicle wherein the vehicle experiences a plurality of ascensions and descensions,
   in response to an ascension of the vehicle operate the motor/generator and the power electronics to output mechanical power to the hybrid powertrain using electrical power from the low power batter, said operation being optimized to draw electrical power from the DC bus consistent with the C-Rate of the low power battery,
   in response to a descension of the vehicle operate the motor/generator and the power electronics to output electrical power to charge the low power battery responsive using mechanical power from the hybrid powertrain, said operation being optimized to provide electrical power to the DC bus consistent with the C-Rate of the low power battery.

2. The system of claim 1 wherein the controller is configured to identify a hybrid-compatible line haul operating state of vehicle based at least in part upon input received from an inclinometer.

3. The system of claim 1 wherein the controller is configured to evaluate an auxiliary electrical load on the DC bus while operating the motor/generator and the power electronics to output electrical power to charge the low power battery.

4. The system of claim 3 wherein the controller is configured to adjust operation of the motor/generator and the power electronics to one of increase and decrease power provided to the DC bus in response a change in demand of the auxiliary electrical load.

5. The system of claim 3 wherein the controller is configured to adjust operation of the motor/generator and the power electronics to one of increase and decrease power provided to the DC bus in response a change in demand of mechanical power demand of the hybrid powertrain.

6. The system of claim 5 wherein vehicle speed during the ascensions and descensions is controlled to a constant target speed of the vehicle.

7. The system of claim 1 wherein the controller is configured to identify a hybrid-compatible line haul operating state of vehicle based at least in part upon input received wirelessly from a system external to the vehicle.

8. The system of claim 1 wherein the low power battery has a C-Rate less than 0.2-C.

9. A method comprising:
operating a hybrid vehicle system including an internal combustion engine structured to output power to propel the vehicle, a motor/generator structured selectably operate as a generator to receive mechanical power from the powertrain and output AC electrical power and to selectably operate as a motor to output mechanical power to the powertrain, power electronics structured to selectably convert the AC electrical power received from the motor/generator to DC power provided to a DC bus and to selectably convert DC power from the DC bus to AC power to drive the motor/generator, a low power battery operatively coupled with the DC bus of the power electronics, the low power battery having a C-Rate less than 0.9-C, and a controller operatively coupled with the motor/generator and the power electronics, wherein the controller is structured to
identify a hybrid-compatible line haul operating state of vehicle wherein the vehicle experiences ascensions and descensions,
in response to an ascension of the vehicle operate the motor/generator and the power electronics to output mechanical power to the hybrid powertrain using electrical power from the low power batter, said operation being optimized to draw electrical power from the DC bus constrained by the C-Rate of the low power battery,
in response to a descension of the vehicle operate the motor/generator and the power electronics to output electrical power to charge the low power battery responsive using mechanical power from the hybrid powertrain, said operation being optimized to provide electrical power to the DC bus constrained by the C-Rate of the low power battery.

10. The method of claim 9 wherein the controller is configured to identify a hybrid-compatible line haul operating state of vehicle based at least in part upon input received from an inclinometer.

11. The method of claim 9 wherein the controller is configured to evaluate an auxiliary electrical load on the DC bus while operating the motor/generator and the power electronics to output electrical power to charge the low power battery.

12. The method of claim 11 wherein the controller is configured to adjust operation of the motor/generator and the power electronics to one of increase and decrease power provided to the DC bus in response a change in demand of the auxiliary electrical load.

13. The method of claim 11 wherein the controller is configured to adjust operation of the motor/generator and the power electronics to one of increase and decrease power provided to the DC bus in response a change in demand of mechanical power demand of the hybrid powertrain.

14. The method of claim 9 wherein the low power battery has a C-Rate less than 0.5-C.

15. An apparatus comprising:
a non-transitory controller readably memory medium configured with instructions executable by a controller to operate at least in part a hybrid vehicle system including an internal combustion engine structured to output power to propel the vehicle, a motor/generator structured selectably operate as a generator to receive mechanical power from the powertrain and output AC electrical power and to selectably operate as a motor to output mechanical power to the powertrain, power electronics structured to selectably convert the AC electrical power received from the motor/generator to DC power provided to a DC bus and to selectably convert DC power from the DC bus to AC power to drive the motor/generator, a low power battery operatively coupled with the DC bus of the power electronics, the low power battery having a C-Rate less than 0.9-C, the instructions being executable to executable instructions a controller operatively coupled with the motor/generator and the power electronics, wherein the instructions are executable by the controller to:
identify a hybrid-compatible line haul operating state of vehicle wherein the vehicle is experiencing ascension or descension,
in response to an ascension of the vehicle operate the motor/generator and the power electronics to output mechanical power to the hybrid powertrain using electrical power from the low power batter, said operation being optimized to draw electrical power from the DC bus optimized for the C-Rate of the low power battery,
in response to a descension of the vehicle operate the motor/generator and the power electronics to output electrical power to charge the low power battery responsive using mechanical power from the hybrid powertrain, said operation being optimized to provide electrical power to the DC bus optimized for the C-Rate of the low power battery.

16. The apparatus of claim 15 wherein the instructions are executable to identify a hybrid-compatible line haul operating state of vehicle based at least in part upon input received from an inclinometer.

17. The apparatus of claim 15 wherein the instructions are executable to evaluate an auxiliary electrical load on the DC bus while operating the motor/generator and the power electronics to output electrical power to charge the low power battery.

18. The apparatus of claim 17 wherein the instructions are executable to adjust operation of the motor/generator and the power electronics to one of increase and decrease power provided to the DC bus in response a change in demand of the auxiliary electrical load.

19. The apparatus of claim 17 wherein the instructions are executable to adjust operation of the motor/generator and the power electronics to one of increase and decrease power provided to the DC bus in response a change in demand of mechanical power demand of the hybrid powertrain.

20. The apparatus of claim 15 wherein the low power battery has a C-Rate less than 0.5-C.

* * * * *